United States Patent
Jalal et al.

(10) Patent No.: US 11,086,802 B1
(45) Date of Patent: Aug. 10, 2021

(54) APPARATUS AND METHOD FOR ROUTING ACCESS REQUESTS IN AN INTERCONNECT

(71) Applicant: Arm Limited, Cambridge (GB)

(72) Inventors: Jamshed Jalal, Austin, TX (US); Tushar P. Ringe, Austin, TX (US); Mark David Werkheiser, Austin, TX (US); Gurunath Ramagiri, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/819,566

(22) Filed: Mar. 16, 2020

(51) Int. Cl.
*G06F 13/364* (2006.01)
*G06F 13/16* (2006.01)
*G06F 11/30* (2006.01)
*G06F 9/30* (2018.01)
*G06F 13/40* (2006.01)

(52) U.S. Cl.
CPC ...... *G06F 13/1642* (2013.01); *G06F 9/30047* (2013.01); *G06F 11/3037* (2013.01); *G06F 13/1668* (2013.01); *G06F 13/364* (2013.01); *G06F 13/404* (2013.01)

(58) Field of Classification Search
CPC .................................................. G06F 13/1642
USPC ........................................................ 711/154
See application file for complete search history.

(56) References Cited

U.S. PATENT DOCUMENTS

| 5,656,962 A * | 8/1997 | Banik ............... H03K 3/012 327/202 |
| 5,794,037 A * | 8/1998 | Young .................. G06F 9/461 345/522 |
| 7,979,588 B1 * | 7/2011 | Tran .................. G06F 13/387 709/253 |
| 2007/0162650 A1 * | 7/2007 | Bruce ................. G06F 13/385 710/22 |
| 2009/0132743 A1 * | 5/2009 | Drerup .............. G06F 13/4022 710/110 |

(Continued)

*Primary Examiner* — Titus Wong
(74) *Attorney, Agent, or Firm* — Nixon & Vanderhye P.C.

(57) ABSTRACT

A technique is provided for routing access requests within an interconnect. An apparatus provides a plurality of requester elements for issuing access requests, and a slave element to be accessed in response to the access requests. An interconnect is used to couple the plurality of requester elements with the slave element, and provides an intermediate element that acts as a point of serialisation to order the access requests issued by the plurality of requester elements via the intermediate element. Communication channels are provided within the interconnect to support communication between each of the requester elements and the intermediate element, and between the intermediate element and the slave element. At least one requester element is a channel selectable requester element, and the interconnect further provides, for each channel selectable requester element, a bypass communication channel to support a direct communication between that channel selectable requester element and the slave element that bypasses the intermediate element. Each channel selectable requester element is then arranged, in the presence of a direct slave access condition, to issue an access request over the bypass communication channel to the slave element without that access request passing via the intermediate element.

20 Claims, 12 Drawing Sheets

(56) References Cited

U.S. PATENT DOCUMENTS

| | | | | |
|---|---|---|---|---|
| 2009/0265483 A1* | 10/2009 | Alexandre | .......... | G06F 13/1684 710/22 |
| 2010/0169527 A1* | 7/2010 | Drerup | ................ | G06F 13/4022 710/110 |
| 2010/0199007 A1* | 8/2010 | Kapelner | .............. | G06F 13/423 710/110 |
| 2012/0079203 A1* | 3/2012 | Balasubramanian | ........................ | G06F 12/1081 711/122 |

* cited by examiner

DETERMINATION OF DIRECT SLAVE ACCESS CONDITION
WHEN USING APPROACH OF FIG. 4A

DETERMINATION OF DIRECT SLAVE ACCESS CONDITION
WHEN USING APPROACH OF FIG. 4B

APPARATUS AND METHOD FOR ROUTING ACCESS REQUESTS IN AN INTERCONNECT

BACKGROUND

The present technique relates to an apparatus and method for routing access requests in an interconnect.

An interconnect may be used to couple a plurality of requester elements with one or more slave elements. The requester elements may be arranged to issue access requests, and an access request may cause a slave element targeted by that access request to be accessed (for example to either write data to the slave element or to read data from the slave element).

An intermediate element may be provided within the interconnect for coordinating the processing of access requests targeting an associated slave element. Whilst such an approach is suitable for many common use cases, in certain situations such an approach can result in additional latency in the processing of an access request for no actual benefit, along with the potential to waste some of the available bandwidth of the intermediate element. It would be desirable to avoid such additional latency and wasted bandwidth in such situations.

SUMMARY

In one example arrangement, there is provided an apparatus comprising: a plurality of requester elements to issue access requests; a slave element to be accessed in response to the access requests; an interconnect to couple the plurality of requester elements with the slave element, the interconnect providing an intermediate element acting as a point of serialisation to order the access requests issued by the plurality of requester elements via the intermediate element; and the interconnect further providing communication channels to support communication between each of the requester elements and the intermediate element, and between the intermediate element and the slave element; wherein: at least one requester element in the plurality of requester elements is a channel selectable requester element, and the interconnect further provides, for each channel selectable requester element, a bypass communication channel to support a direct communication between that channel selectable requester element and the slave element that bypasses the intermediate element; and each channel selectable requester element is arranged, in the presence of a direct slave access condition, to issue an access request over the bypass communication channel to the slave element without that access request passing via the intermediate element.

In another example arrangement, there is provided a method of routing access requests in an interconnect, comprising: employing the interconnect to couple a plurality of requester elements used to issue access requests with a slave element to be accessed in response to the access requests; providing an intermediate element in the interconnect to act as a point of serialisation to order the access requests issued by the plurality of requester elements via the intermediate element; providing communication channels to support communication between each of the requester elements and the intermediate element, and between the intermediate element and the slave element; arranging at least one requester element in the plurality of requester elements to be a channel selectable requester element; providing, for each channel selectable requester element, a bypass communication channel to support a direct communication between that channel selectable requester element and the slave element that bypasses the intermediate element; and causing each channel selectable requester element, in the presence of a direct slave access condition, to issue an access request over the bypass communication channel to the slave element without that access request passing via the intermediate element.

In a still further example arrangement, there is provided an apparatus comprising: a plurality of requester element means for issuing access requests; a slave element means for being accessed in response to the access requests; interconnect means for coupling the plurality of requester element means with the slave element means, the interconnect means providing an intermediate element means for acting as a point of serialisation to order the access requests issued by the plurality of requester element means via the intermediate element means; and the interconnect means further providing communication channel means for supporting communication between each of the requester element means and the intermediate element means, and between the intermediate element means and the slave element means; wherein: at least one requester element means in the plurality of requester element means is a channel selectable requester element means, and the interconnect means further provides, for each channel selectable requester element means, a bypass communication channel means for supporting a direct communication between that channel selectable requester element means and the slave element means that bypasses the intermediate element means; and each channel selectable requester element means is arranged, in the presence of a direct slave access condition, to issue an access request over the bypass communication channel means to the slave element means without that access request passing via the intermediate element means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
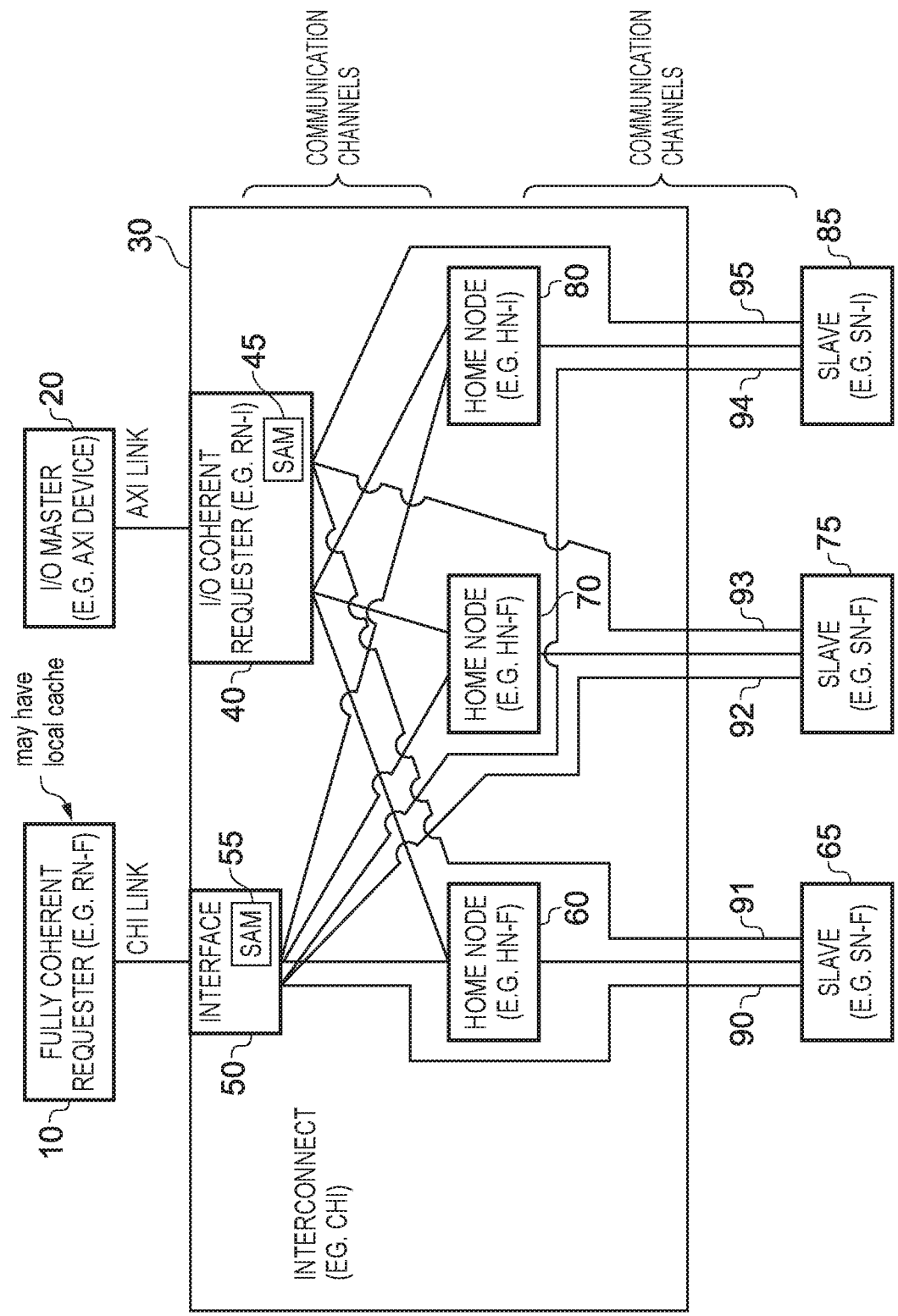
FIG. 1 is a block diagram of a system in accordance with one example arrangement.

In accordance with one example implementation, an apparatus is provided that has a plurality of requester elements for issuing access requests, and a slave element to be accessed in response to the access requests. It will be appreciated that the apparatus may in fact comprise multiple slave elements, but for the purposes of the following discussion one of those slave elements will be considered.

The apparatus also provides an interconnect for coupling the plurality of requester elements with the slave element, and that interconnect also provides an intermediate element that acts as a point of serialisation to order the access requests issued by the plurality of requester elements via the intermediate element. In some instances, the access requests may specify addresses within cacheable regions of memory, and one or more of the requester elements may have a local cache. In such instances the intermediate element can additionally act as a point of coherence, applying a cache coherency protocol in order to ensure that each of the requester elements sees the most up to date version of the data being accessed in response to its access requests.

The interconnect further provides communication channels to support communication between each of the requester elements and the intermediate element, and between the intermediate element and the slave element.

In accordance with the techniques described herein, at least one requester element amongst the plurality of requester elements is a channel selectable requester element, and the interconnect further provides, for each channel selectable requester element, a bypass communication channel to support a direct communication between that channel selectable requester element and the slave element that bypasses the intermediate element. Each channel selectable requester element is then arranged, in the presence of a direct slave access condition, to issue an access request over the bypass communication channel to the slave element without that access request passing via the intermediate element.

By such an approach, the interconnect can provide for the selective bypassing of the intermediate element for certain access requests. In particular, in certain situations it may be determined that there is no useful purpose served by routing a particular access request via the intermediate element, and in such a situation the direct slave access condition can be indicated, allowing the relevant requester element to directly pass the access request over an associated bypass communication channel to the slave element. This avoids adding any additional latency to the processing of that access request that might otherwise be incurred by routing the access request via the intermediate element, and can also avoid consuming a portion of the available bandwidth of the intermediate element in the processing of access requests that do not need to be routed via it.

There are a number of situations where it may be appropriate to flag the direct slave access condition, so as to enable one or more access requests to be routed directly to a slave element from a requester element, rather than being routed via the intermediate element. For example, there may be certain regions of memory which, at least at certain points in time, store data that is only being utilised by a single requester element, and hence it may be the case that the point of serialisation functionality implemented by the intermediate element is not required in relation to a series of access requests targeting such a memory region. By providing the bypass communication channel, this can enable a more efficient handling of such access requests, and can also free up the resources of the intermediate element to handle other access requests. Such an approach can also produce other benefits. For example, there may be a size limit on the amount of data that can be accessed by an access request that needs to be routed via the intermediate element, and that size restriction may not need to be imposed in relation to access requests routed via the bypass communication channel, hence enabling a more efficient processing of accesses to larger blocks of data, for example by supporting larger burst sizes when using the bypass communication channel.

There are a number of ways in which the direct slave access condition can be determined. However, in one example implementation, for each access request, presence of the direct slave access condition is determined in dependence on a memory address specified by that access request. Accordingly, the presence or the absence of the direct slave access condition can be set independently for different memory address regions, such that accesses to one or more memory address regions may be able to make use of the bypass communication channel, whilst accesses to other regions may not, and may instead be required to be routed via the intermediate element to ensure that the point of serialisation functionality of the intermediate element is applied in relation to such access requests. It should further be noted that, in some example implementations, one requester element may be configured to view a particular memory region differently to another requester element, so that direct access may be supported for one requester but not another.

In one example implementation address mapping circuitry may be provided in association with each requester element to convert a memory address specified by an access request issued by that requester element into a target identifier indicating a completer element to which the access request is to be routed via the communication channels. Typically, the completer element may be determined to be an intermediate element within the interconnect, and that intermediate element then operates to forward the request onto the ultimate target slave element. However, for each channel selectable requester element, the address mapping circuitry may be arranged, in the presence of the direct slave access condition, to generate the target identifier to indicate the slave element as the completer element, as a result of which the access request can then be routed over the bypass communication channel to the slave element without routing that access request via the intermediate element. Hence, by appropriate configuration of the address mapping circuitry so that it maintains target identifiers not just for each intermediate element that may be provided, but also for any slave element that may be directly communicated with via a bypass communication channel, it is then possible to selectively make use of the bypass communication channel when the direct slave access condition is detected.

There are a number of ways in which the address mapping circuitry can be alerted as to the presence or absence of the direct slave access condition. For example, in one implementation the address mapping circuitry may be arranged to receive a control signal which indicates whether the direct slave access condition is present. This control signal can be issued in a variety of ways. For example, in one implementation the at least one channel selectable requester element may be arranged to issue the control signal to its associated address mapping circuitry. As one particular example, it may be the case that the channel selectable requester element is external to the interconnect, and communicates with an interface element in the interconnect, where that interface element includes the associated address mapping circuitry for the channel selectable requester element. In such a scenario, the channel selectable requester element may issue the access request to the interface, and include as part of that request a control signal that is used by the address mapping circuitry to determine whether the direct slave access condition is present or not. For instance, the channel selectable requester element may be aware of which address regions are regions that can be accessed via the direct access mechanism, and can set the control signal accordingly.

As another example mechanism that may be used to provide the control signal to the address mapping circuitry, at least one channel selectable requester element may be arranged to receive an initial request from an associated master device coupled to that channel selectable requester element, and to generate the access request from that initial request. In such a situation, the control signal may be provided in the initial request. Hence, in one such example implementation the channel selectable requester element may be considered to be an element provided within the interconnect, with the original access request actually emanating from an associated master device. In such situations, the address mapping circuitry may be considered to be a component within the channel selectable requester element, and the control signal may be provided in the initial request from the associated master device to identify to the address mapping circuitry whether the direct slave access condition is present or not.

As an alternative to the address mapping circuitry receiving a control signal to indicate whether the direct slave access condition is present, in accordance with an alternative implementation the address mapping circuitry may have configuration storage that is arranged to identify, for each of a plurality of memory regions, whether the direct slave access condition is present. Hence, in such situations, it is the address mapping circuitry itself that determines whether the direct slave access condition is present or not, through reference to the configuration storage using the address specified in the received access request to determine which memory region is being accessed, and to determine whether that memory region is a memory region for which the direct slave access condition is present or not. It can then generate a suitable target identifier accordingly, in particular either generating as the target identifier an identifier for the intermediate element or an identifier for the slave element, depending on the determination as to the presence or absence of the direct slave access condition.

In some example implementations, the intermediate element may be arranged to issue a completion signal in response to a received access request before the access request has actually been processed within the ultimate target slave element. This can improve performance by allowing the requester element to continue its processing without needing to wait for the access to actually complete. In particular, the intermediate element may be arranged, when processing an access request specifying a given memory address that has been received from a given requester element within the plurality of requester elements, to issue a completion signal to the given requester element to indicate that sufficient steps have been taken by the intermediate element to ensure that an outcome of an operation required by that access request will be observed by a further requester element within the plurality of requester elements that issues to the intermediate element a further access request specifying that given memory address. Hence, the intermediate element can take steps to ensure global observability of the results of certain access requests even before those access requests have been processed in respect of the ultimate slave element, to thereby provide performance benefits.

However, this can cause issues when one or more bypass communication channels to the relevant slave element are also provided, since the intermediate element cannot ensure global observability if one or more requester elements might bypass the intermediate element and access the slave element directly.

In accordance with the techniques described herein, this issue can be alleviated by providing the intermediate element with control storage in which there is provided a completion mode field. When the completion mode field indicates a default mode, the intermediate element is arranged as discussed above, to enable issuance of the completion signal before the operation required by the access request has been performed by the slave element. However, when the completion mode field indicates a delayed completion mode, the intermediate element is arranged, for at least a subset of access request types, to defer issuing the completion signal until the operation required by the access request has been performed by the slave element. The delayed completion mode can hence be used in certain situations to avoid an early indication of completion being provided to the requester element. This can be useful in a variety of scenarios, including a producer/consumer scenario that will be discussed in more detail below.

The completion mode field may be provided in a variety of ways, but in one example the completion mode field is provided for each of a plurality of memory regions. Hence, in one particular example implementation, a completion mode field may be provided for each memory region that can separately be identified as being a direct slave access region or a non-direct slave access region.

In one example arrangement, a producer element may be able to output generated data for storage in the slave device at memory addresses within a given memory region, and then a completer element may be given access to that data. By such an approach, data can be transferred from the producer element to the completer element via the slave device. In situations where a given requester element operates as the producer element, it may be that case that a given channel selectable requester element, different to that given requester element, is arranged to operate as the consumer element to process the generated data.

In accordance with the techniques described herein, the producer element may be arranged to communicate with the intermediate element and, at a selected point prior to the consumer element being allowed access to the given memory region, may be arranged to cause the completion mode field for the given memory region to be set to indicate the delayed completion mode. The producer element is then arranged to issue one or more requests to the intermediate element after the completion mode field has been set to indicate the delayed completion mode, and the producer element is arranged to await receipt of the completion signal for each of the one or more requests before taking an action that causes the consumer element to be allowed access to the given memory region. By such an approach, it can be ensured that the output generated data has actually reached the slave device before the consumer element is allowed to access the given memory region, thereby ensuring that the consumer element accesses the correct data, i.e. the data that has been produced by the producer element.

It will be appreciated that there are a number of actions that could be taken by the producer element to cause the consumer element to be allowed access to the given memory region. For example, the given memory region could be protected by a flag, and only when the flag is set by the producer element may the consumer element be allowed access to the memory region. As an alternative arrangement, it may be the case that the producer element can issue an interrupt to the consumer element, in order to wake the consumer element up at a point in time where the consumer element is allowed to access the given memory region.

Once the consumer element is allowed to access the given memory region, then in accordance with the techniques described herein the consumer element may be arranged to issue access requests over the bypass communication channel to the slave device in order to access the generated data. In particular, at this point in time, it may be the case that the region of memory will only be accessed by the consumer element, and accordingly there is no need to route the access requests via the intermediate element, as the point of serialisation functionality provided by the intermediate element is not required in relation to such accesses. This can significantly reduce latency, and free up the resources of the intermediate element to handle other requests.

In one example arrangement, the producer element may be arranged to trigger a direct slave access condition setting operation in respect of the given memory region prior to the consumer element being allowed access to the given memory region, such that when the consumer element subsequently issues the access requests to access the generated data the consumer element determines that the direct slave access condition exists and hence issues the access requests over the bypass communication channel In particular, in some implementations it may be the case that the given memory region can be selectively configurable to be either indicated as a region that can be accessed via direct slave access or a region that cannot be accessed via direct slave access. In such instances, the producer element can be arranged to change the setting for the given memory region so that it is indicated as being a region that can be accessed via the direct slave access approach, and hence is a region for which the direct slave access condition is determined to be present, prior to the consumer being given access to the given memory region. This will cause the consumer element to then use the bypass communication channel when accessing addresses within that given memory region.

Alternatively, it may be the case that, for any particular requester element, its view of one or more memory regions is fixed. Hence, for one requester element, the given memory region may be considered to be a region that cannot be accessed via a direct slave access, whereas for another requester element the same given memory region may be viewed as a region that can be accessed via a direct slave access. In such a case, it may be the situation that the consumer element has the given memory region marked as a direct slave access region, and hence the producer element does not need to trigger any change in the view of that given memory region by the consumer element before allowing the consumer element to access that given memory region.

In one example implementation at least one of the requester elements has associated cache storage. The intermediate element may then provide snoop circuitry to implement a cache coherency protocol when an access request received by the intermediate element identifies a cacheable memory address, such that the intermediate element acts as a point of coherence for the access requests issued by the plurality of requester elements. In one such example implementation, at least a subset of the generated data produced by the producer element is associated with cacheable memory addresses. In such a scenario, there is a possibility that write access requests issued by the producer element may result in the write data being stored within a cache, but not at that time propagated on to the slave element.

In order to address that issue when it is intended to allow a consumer element that has access to a bypass communication channel to subsequently access that data directly from the slave element, the one or more requests issued by the producer element to the intermediate element after the completion mode field has been set to indicate the delayed completion mode may comprise cache flush requests that cause a cached copy of the generated data stored in any cache storage to be flushed to the slave element. Hence, at least for those cache flush requests, this ensures that the producer element does not receive completion signals for those requests until the data has actually been stored within the slave element. This hence ensures that by the time the producer element decides to allow the consumer element to access the slave element, the required generated data will be directly accessible by the consumer element from the slave element via the bypass communication channel.

It should be noted that the point in time at which the completion mode field is set may be varied dependent on implementation. For example, the delayed completion mode may not cause a delay to the issued completion signal for all access requests. Hence in the above example, it may be the case that even if the completion mode field is set prior to the cacheable write access requests being issued, the completion signal issued in respect of the cacheable write access requests may not be delayed, but nevertheless the completion signals issued for the subsequent cache flush requests will be delayed, and accordingly the required behaviour will be obtained.

In another example implementation, the generated data produced by the consumer may be non-cacheable data. In such instances, the one or more requests issued by the producer element to the intermediate element after the completion mode field has been set to indicate the delayed completion mode may comprise write access requests specifying the generated data. In particular, in one example implementation, once the completion mode field has been set, then delayed completion signals will be issued in respect of any write access requests specifying non-cacheable data.

The apparatus may provide write buffer circuitry to enable temporary buffering of data to be written to the slave device, before that data is written to the slave device. However, by setting the completion mode field for the given memory region to indicate the delayed completion mode before the write access requests specifying the generated data are issued, this ensures that the producer element only receives completion signals for those write access requests once the generated data has been stored in the slave element. This hence ensures that if the consumer element subsequently seeks to access that data via the bypass communication channel, it will access the correct data from the slave element.

The given memory region can take a variety of forms, for example it may be a region within main memory. Alternatively, it may be device memory. Device memory may for example consist of memory mapped registers, and when bits in those registers are set to certain values, this can trigger one or more side effects, for example it may trigger a new mode of operation.

In one example implementation, the above technique can be used not only for standard types of access requests, such as read and write access requests to memory, but can also be used when handling exclusive access requests that are issued by the plurality of requester elements in order to seek to acquire exclusive access to a memory region. For example, such exclusive read and write access requests can be used to read a lock value associated with a shared memory region, and to then seek to set that lock value in order to gain exclusive access to that shared memory region. Typically, exclusives monitor circuitry used to handle such exclusive access requests may be provided within the intermediate element, since it would typically be the case that all such exclusive access requests are routed through the intermediate element. However, in situations where such exclusive access requests could be propagated directly to the slave device via a bypass communication channel, then it is insufficient to provide exclusives monitor circuitry within the intermediate element.

In accordance with the techniques described herein, the slave element may comprise exclusives monitor circuitry to handle such exclusive access requests, and the exclusives monitor circuitry provided within the slave element is arranged to receive both exclusive access requests propagated from a requester element via the intermediate element over the communication channel between the intermediate element and the slave element, and exclusive access requests received over the bypass communication channel directly from a requester element. In such scenarios, any exclusives monitor circuitry functionality provided within the intermediate element may be turned off, and instead any such exclusive access requests that are received by the intermediate element may merely be propagated on to the slave element, where the exclusives monitor circuitry within the slave element will then handle that exclusive access request.

In one example implementation, the slave element may have retry control circuitry for keeping track of any access requests that it rejects, and instead issues retry signals for. Typically, that retry control circuitry would only need to track retry signals issued to an intermediate element, since it would expect to receive all of its access request traffic via an intermediate element. However, when providing the bypass communication channel, it is possible that the slave element will receive access requests not only from intermediate elements, but also directly from requester elements. Accordingly, in one example implementation the slave element comprises retry control circuitry that is extended to track, for both the intermediate element and each requester element having the bypass communication channel, access requests for which retry signals have been issued by the slave device.

In addition to supporting the direct communication of access requests from a requester element to a slave element, the bypass communication channel may further support the provision of a response to an access request from the slave device to the associated requester element, bypassing the intermediate element, thereby further improving performance.

Particular examples will now be described with reference to the Figures.

FIG. 1 is a block diagram of a system in accordance with one example implementation. The apparatus includes a plurality of requester elements 10, 40 that are coupled via an interconnect 30 to a plurality of slave elements 65, 75, 85. The slave elements may take a variety of forms, and for instance may be elements used to provide normal memory or may be elements forming peripheral devices.

Within the interconnect 30, a number of intermediate elements 60, 70, 80 may be provided that can be used to act as a point of serialisation to order the access requests issued by the plurality of requester elements 10, 40 via those intermediate elements. Herein, such intermediate elements will also be referred to as home nodes.

The interconnect provides communication channels for supporting communication between each of the requester elements and the various home nodes, and for supporting communication between the home nodes and associated slave elements. Whilst in FIG. 1 each home node connects to a single slave element, in some implementations multiple home nodes may connect to the same slave element, or one home node could connect to multiple slave elements.

In the example shown in FIG. 1, two types of requester element are shown, referred to herein as a fully coherent requester 10 and an input/output (I/O) coherent requester 40. A fully coherent requester such as element 10 shown in FIG. 1 may have an associated local, hardware-coherent, cache, and is arranged to connect to the interconnect 30 via an associated interface 50.

Access requests issued by requester elements 10, 40 that relate to cacheable memory addresses will be routed via fully coherent home nodes, which in this example are illustrated by the elements 60, 70, and such fully coherent home nodes will act not only as a point of serialisation for access requests, but will also act as a point of coherence, and as such may implement a cache coherency protocol in order to ensure that a requester issuing an access request pertaining to a cacheable memory address will see the most up to date version of the data. Typically, such a coherent home node will include snoop control circuitry for seeking to track which local caches have cached data within particular address regions, to thereby work out which local caches need to be subjected to snoop operations in order to implement the cache coherency protocol.

In contrast to fully coherent requester elements 10, I/O coherent requester elements 40 do not include a hardware-coherent cache, and do not require associated snoop functionality to respond to snoop requests. The home nodes may also include non-coherent home nodes such as the home node 80, that does not provide a point of coherence and is not capable of processing snoopable requests.

As shown in FIG. 1, two different types of slave elements may be provided, namely slave elements 65, 75 that may be coupled to fully coherent home nodes 60, 70, and slave elements such as the slave element 85 that may be coupled to non-coherent home nodes. Slave elements such as the slave elements 65, 75 may be used for normal memory, whilst slave elements such as the slave element 85 may be used for peripheral or device memory, or for normal memory.

Whilst the techniques described herein can be employed in respect of various types of interconnect, for the purposes of the following discussion it will be assumed that the interconnect 30 uses the Advanced Microcontroller Bus Architecture (AMBA) developed by Arm® Limited, Cambridge, United Kingdom, and in particularly uses the AMBA 5 CHI (coherent hub interface) Architecture Specification. In accordance with that specification, the fully coherent requester elements are referred to as RN-Fs (fully coherent request nodes) and the fully coherent home nodes are referred to as HN-Fs (fully coherent home nodes). The I/O coherent requester elements are referred to as RN-Is (I/O coherent request nodes) in accordance with the above specification, and such request nodes are arranged to only generate a subset of transactions defined by the interconnect protocol, and do not require snoop functionality. Similarly, the non-coherent home nodes are referred to in the AMBA 5 CHI architecture specification as HN-Is. Such a home node may be arranged to process a limited subset of the transactions defined by the protocol and, whilst acting as a point of serialisation, does not provide a point of coherence and is not capable of processing a snoopable request. In addition, as shown in FIG. 1, in accordance with the above specification, the slave elements connected to coherent home nodes are referred to as SN-Fs, whilst the slave elements connected to non-coherent home nodes are referred to as SN-Is.

In the example shown in FIG. 1, an I/O coherent requester 40 can be considered to be part of the interconnect, and is connected via an external link to an upstream master device, such as the I/O master device 20. Whilst the interconnect 30 may operate in accordance with the above described CHI architecture specification, and any connected fully coherent requester 10 may be connected using a CHI link as shown in FIG. 1, a master device such as the I/O master device 20 may typically use a different communication protocol, and will be connected to the I/O coherent requester 40 via a link using that other protocol. In the example shown in FIG. 1, it is assumed that the I/O master element 20 uses the AMBA AXI protocol specification developed by Arm® Limited, Cambridge, United Kingdom, and is connected to the interconnect 30 via an AXI link.

Typically any access request issued by a requester element 10, 40 would be initially routed to the appropriate home node 60, 70, 80, taking account of the slave element 65, 75, 85 containing the address referenced in the access request. The relevant home node 60, 70, 80 will then act as point of serialisation to order access requests issued by the multiple requester elements to the associated slave element. Further, in the case of coherent home nodes, the home node will act as a point of coherence, and employ snoop circuitry or the like to implement a cache coherency protocol to ensure that the most up to date data is accessed in response to each access request.

However, in accordance to the techniques described herein one or more bypass communication channels are provided that, under certain conditions, can be used by a requester element to enable a direct transfer of an access request to the required slave element, bypassing the associated home node. In the example shown in FIG. 1, bypass communication channels 90, 91, 92, 93, 94, 95 are provided to each of the slave elements 65, 75, 85 for each of the requester elements 10, 40.

As will be discussed in more detail herein, in the presence of a direct slave access condition, a requester element that has a bypass communication channel provided for a slave element that it wishes to issue an access request to, may be arranged to use the bypass communication channel to issue that access request directly to the slave element, bypassing the associated home node. The direct slave access condition could be determined in a variety of ways, but in one example implementation, for each access request, presence of the direct slave access condition may be determined in dependence on a memory address specified by that access request.

Figure 2:
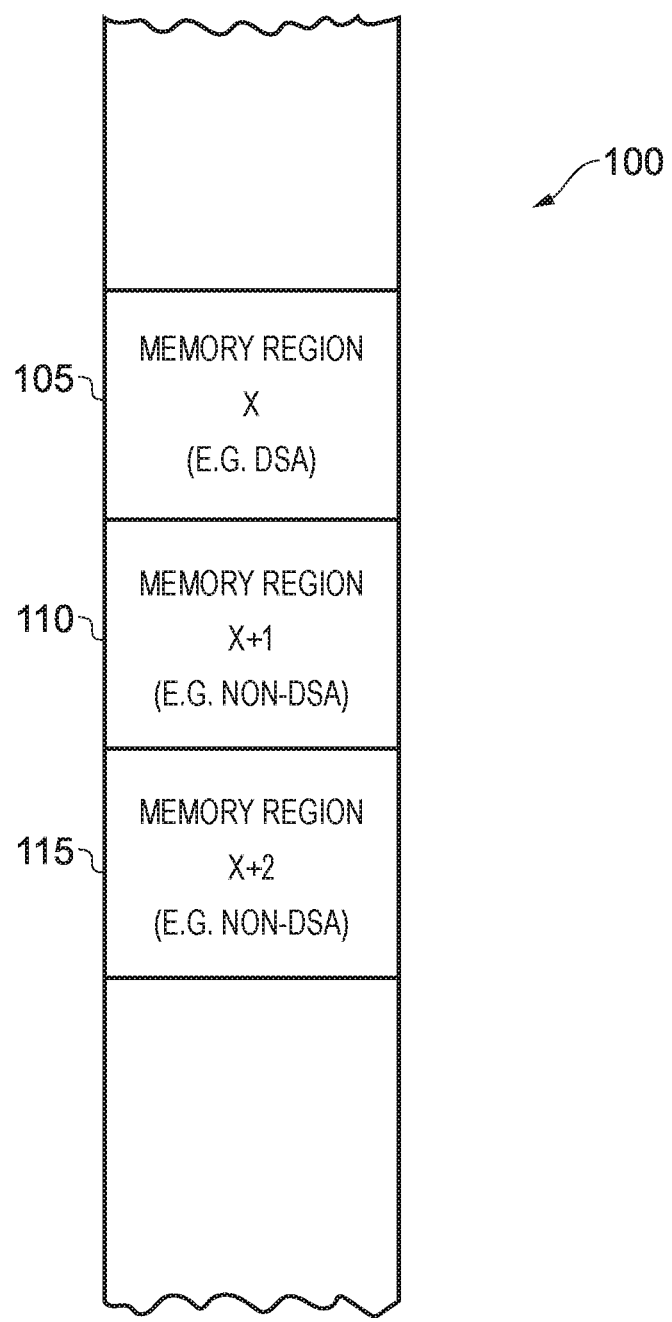
FIG. 2 schematically illustrates how a memory address space may be partitioned into different regions for which direct slave access may be supported or not supported, in accordance with one example arrangement.

For example, as shown in FIG. 2, a memory address space 100 may be considered to consist of a plurality of regions 105, 110, 115, and whether or not direct slave access is supported for that memory region may be specified on a per region basis. Hence, in this particular example shown in FIG. 2, the memory region 105 may be identified as being a direct slave access (DSA) region, whilst the memory regions 110, 115 are identified as non-DSA regions. It should be noted that whilst in one example implementation every requester element's view of the memory address space may be the same, this is not a requirement, and in some implementations different requester elements may view different memory regions differently, and hence for example a first requester element may view a particular memory region as being a DSA region, whilst a different requester element views the same memory region as being a non-DSA region. When a requester element seeks to access an address within a memory region that is provided by a particular slave element that that requester element has a bypass communication channel for, and the identified memory region is considered to be a DSA region, then that requester element can issue the access request via the bypass communication channel directly to the slave element, bypassing the home node.

The routing of access requests through the interconnect is performed under the control of a system address map (SAM) component, and a SAM may be provided in association with each requester element. As shown in FIG. 1, for a fully coherent requester such as the requester 10, the associated SAM 55 may be provided within the interface 50 of the interconnect 30 in one example implementation, whilst for an I/O coherent requester such as the requester 40, the associated SAM 45 may be provided as part of that requester element 40 in one example implementation.

For each requester element, the associated SAM is used to convert a memory address specified by an access request issued by that requester element into a target identifier indicating a completer element to which the access request is to be routed via a communication channel. Typically, the completer element will be identified as one of the home nodes, and the home node will then handle that access request, and if necessary propagate the access request on to a slave element (for this secondary communication the home node may be viewed as the requester and the slave element as the completer). However, in accordance with the techniques described herein, the SAM is extended so as to also maintain target identifiers for any of the slave elements that can be communicated with via a bypass communication channel. Accordingly, the SAM may be arranged, in the presence of the direct slave access condition for a particular request, to generate the target identifier to indicate the slave element that contains the address specified by the access request, hence indicating that slave element as being the completer element, and as a result the access request will be routed over the bypass communication channel to that slave element.

For certain accesses, it has been found that there is no useful purpose served by routing the access request via the home node, and in such a situation allowing the relevant requester element to directly pass the access request over an associated bypass communication channel to the slave element can yield significant benefits. In particular, it can avoid adding any additional latency to the processing of that access request that might otherwise be incurred by routing the access request via the home node. It can also avoid consuming available bandwidth of the home node in handling the access request. As another potential benefit, it may be possible to handle larger burst sizes when using the bypass communication channel, since any restrictions on burst size that may be imposed by the home nodes may be avoided if the bypass communication channel can be used.

In addition to the bypass communication channels being used to route access requests directly from a requester element to a slave element, bypassing the associated home node, the bypass communication channels can also be used to enable responses from the slave element to be routed directly back to the requester element.

Figure 3:
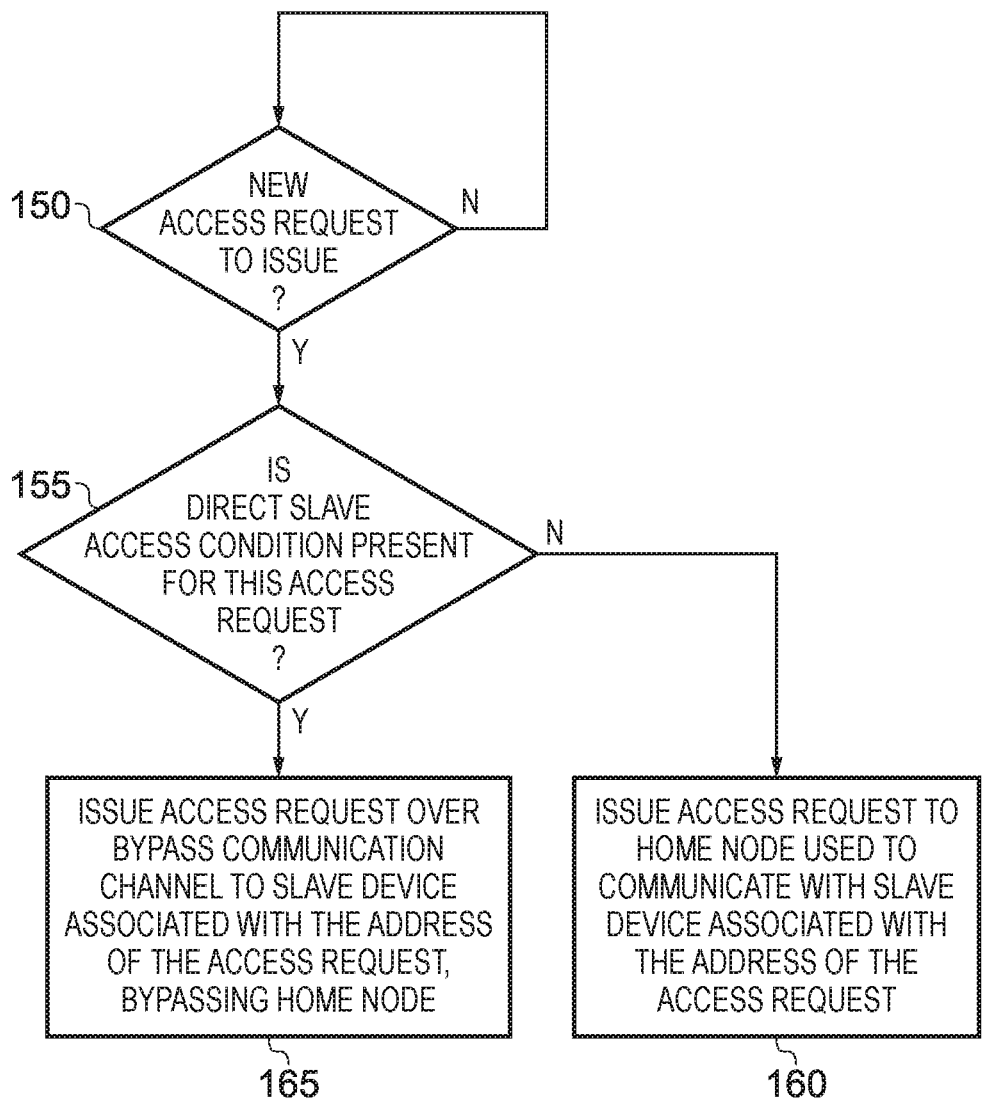
FIG. 3 is a flow diagram illustrating the steps taken when there is a new access request to be issued, in accordance with one example arrangement.

FIG. 3 is a flow diagram illustrating the steps performed when there is a new access request to be issued via the interconnect 30. When such a new access request is to be issued, then at step 155 it can be determined whether the direct slave access condition is present for that access request. This check may be performed by the requester element, or in some instances may be performed by the associated SAM. If the direct slave access condition is not present, then the process proceeds to step 160 where the access request is issued to the appropriate home node that will be used to communicate with the slave device associated with the address of the access request.

However, in the presence of the direct slave access condition, the process instead proceeds to step 165 where the access request is issued over a bypass communication channel to the slave device associated with the address of the access request, bypassing the home node.

Figure 4A:
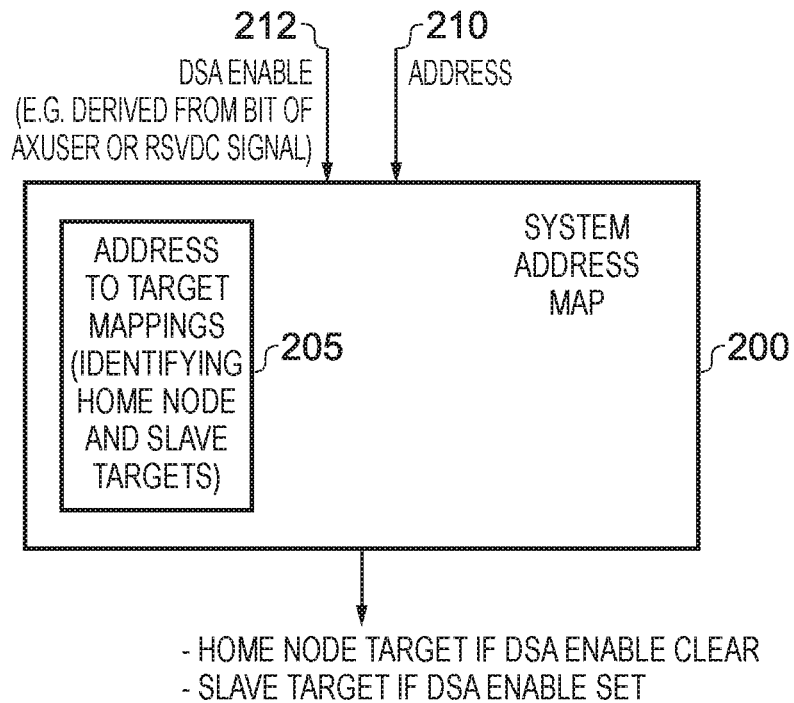
FIGS. 4A and 4B illustrate two different arrangements of system address map circuits that may be used with the system of FIG. 1, in accordance with one example arrangement.
Figure 4B:
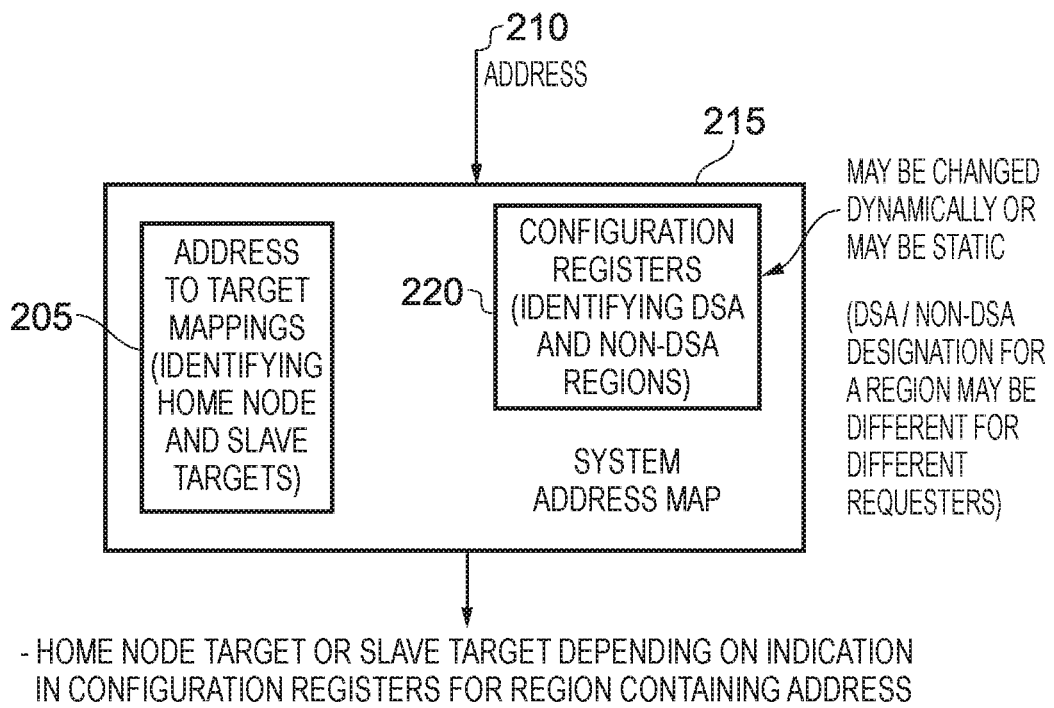

FIGS. 4A and 4B illustrate two different arrangements of the SAM that may be used in example implementations. As shown in FIG. 4A a SAM 200 may include mapping storage 205 to map addresses specified by access requests to target identifiers identifying the component that the access request should be routed to. Whilst previously the targets may all have been identified to be home nodes, in accordance with the techniques described herein the mapping storage 205 will maintain target identifiers for both the home nodes and any slave devices that can be directly communicated with via bypass communication channels provided by the interconnect 30.

In the example shown in FIG. 4A, it is the requester element that determines whether the direct slave access condition is present, and in that event sets a DSA enable signal 212 provided in association with the address 210 of the access request. Considering the CHI link shown in FIG. 1 between the fully coherent requester 10 and the interface 50, the request channel of that CHI link may include a reserved field (referred to as the RSVDC field), and that field may be used to provide the DSA enable flag 212 (for example by interpreting a first value in that field as indicating the presence of the direct slave access condition, and a different value in that field as indicating the absence of the direct slave access condition).

Considering the AXI link shown in FIG. 1 between the I/O master device 20 and the I/O coherent requester 40, then the AXI protocol supports the provision of user information within an AXUSER field (more particularly an ARUSER field for a read access and an AWUSER field for a write access). The value of that field can hence be used to determine whether the direct slave access condition is present or not, with the I/O master device 20 determining presence or absence of the direct slave access condition for the address in question and setting the AXUSER field accordingly.

When the SAM 200 determines from the DSA enable flag 212 that the direct slave access condition is present, then it will map the specified address 210 to a slave target, whereas otherwise it will map the address to a home node target.

FIG. 4B illustrates an alternative implementation where the SAM 215 receives the address 210 of an access request, but in addition to the earlier discussed mappings storage 205, also includes some configuration registers 220 that can be configured to identify the presence or absence of the direct slave access condition for multiple different memory regions. Hence, for each of the memory regions within a specified memory address space the configuration registers may be set to identify whether a region is a direct slave access region or a non-direct slave access region. In one example implementation, the information in the configuration registers may be static, while in other implementations it may be possible to dynamically change the contents of the configuration registers during operation of the system. It is also possible that the configuration registers can be set up differently within the system address maps associated with different requesters, such that, at least for one or more memory regions, one or more requester elements may view such memory regions as being directly accessible via a bypass communication channel, whilst one or more other requesters may not.

Hence, when adopting the approach of FIG. 4B, the SAM 215 will produce either a home node target or a slave target for a specified address 210, depending on the indication in the configuration registers for the region containing that address.

Figure 5A:
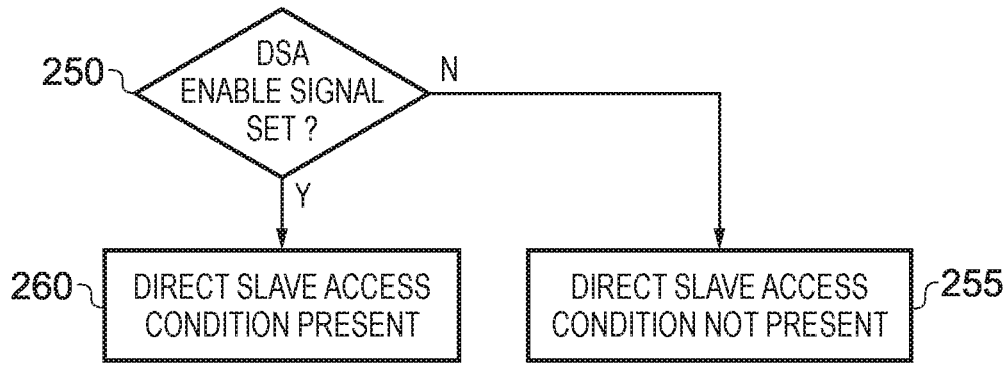
FIGS. 5A and 5B are flow diagrams illustrating how the determination of the direct slave access condition may be detected when using the system address map circuits of FIGS. 4A and 4B, respectively, in accordance with one example arrangement.
Figure 5B:
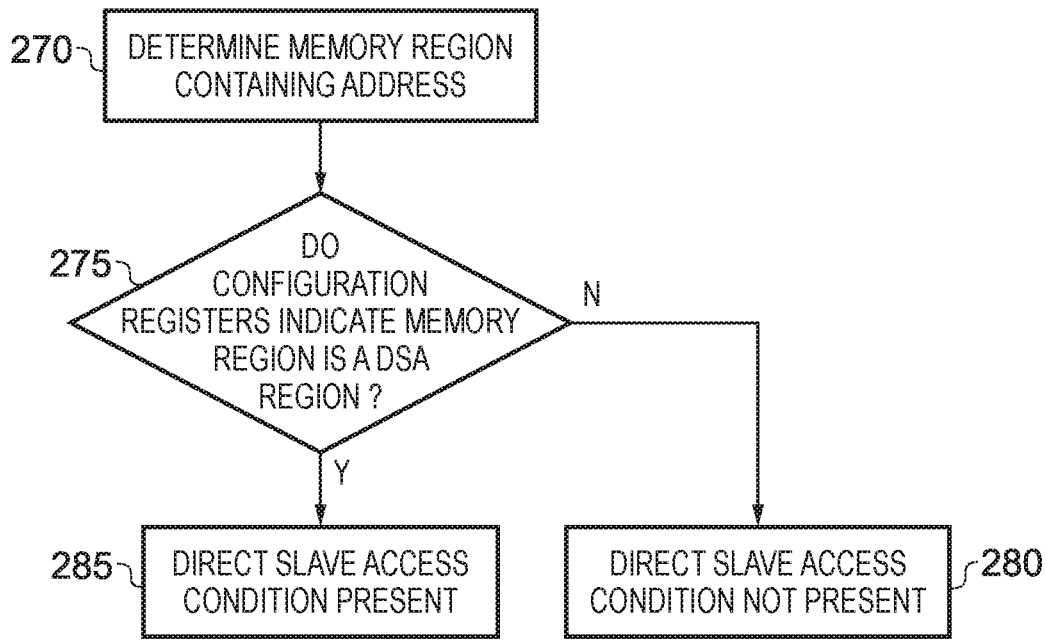

The operation of the system address maps of FIGS. 4A and 4B are illustrated schematically by the flow diagram of FIGS. 5A and 5B. In particular, as shown in FIG. 5A, when using the SAM 200 of FIG. 4A, it is determined at step 250 whether the DSA enable signal 212 is set. If not, then at step 255 it is determined that the direct slave access condition is not present, but in the event that the DSA enable signal is set it is determined at step 260 that the direct slave access condition is present.

When using the SAM 215 of FIG. 4B, then as shown in FIG. 5B it is determined at step 270 what memory region contains the address specified over the path 210. It is then determined at step 275 whether the configuration registers indicate that that memory region is a DSA region. If not, it is determined at step 280 that the direct slave access condition is not present, but if it is determined that the relevant memory region is a DSA region, then at step 285 it is determined that the direct slave access condition is present.

Figure 6A:
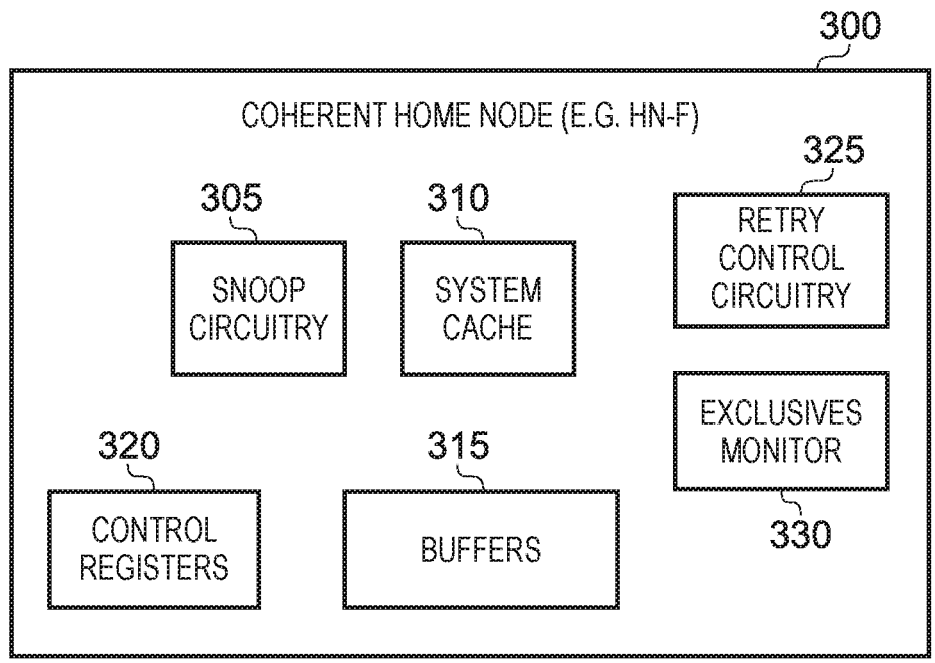
FIGS. 6A and 6B schematically illustrate components that may be provided within a coherent home node and a non-coherent home node within the system of FIG. 1, in accordance with one example arrangement.
Figure 6B:
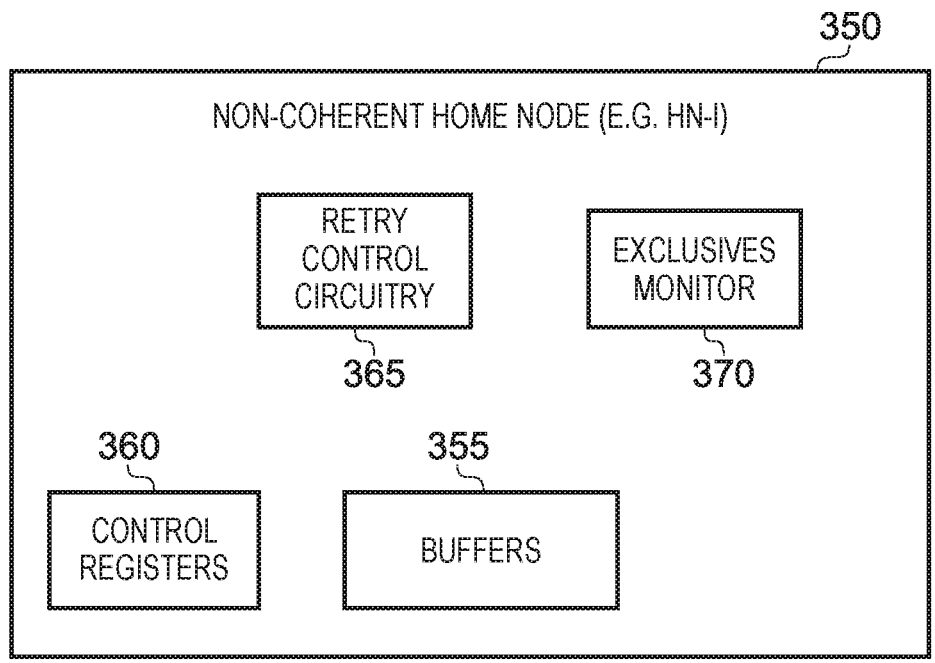

FIGS. 6A and 6B schematically illustrate components that may be provided within a coherent home node 300 or a non-coherent home node 350, respectively. Considering first the coherent home node 300, then this may include snoop circuitry 305 used to implement a cache coherency protocol in respect of received access requests that specify a cacheable memory address, in order to determine whether the local caches provided by any other requester elements need to be subjected to a snoop operation. As a result, a coherent home node acts not only as a point of serialisation, but also as a point of coherence. As shown in FIG. 6A, if desired the coherent home node may also include a system level cache 310.

As shown in FIG. 6A, one or more buffers 315 may be provided within the coherent home node for buffering access requests prior to propagation of those access requests on to an associated slave element. In some implementations, whilst the buffers may be considered to be internal to the coherent home node, they may alternatively be external to the coherent home node, and located within the communication path from the home node to an associated slave element. As a further alternative there may be both internal buffers within the coherent home node and external buffers along the path between the home node and the slave element.

As also shown in FIG. 6A, the coherent home node 300 may include retry control circuitry 325 for keeping track of rejected access requests for which retry requests may be issued back to the associated requester elements. The home node 300 may also include exclusives monitor circuitry for handling exclusive read and write requests. Such exclusive read and write requests may be used to seek to acquire a lock in order to gain exclusive access to an associated memory region. Only one requester will be allowed to gain access to the lock at any point in time, and the exclusives monitor circuitry 330 can be used to keep track of which requester has exclusive access to which region of memory, and to notify requesters that have been unsuccessful in acquiring such exclusive access, for example so that they can retry at a subsequent point in time to gain exclusive access to the required memory region.

A home node, whether that be a coherent home node or a non-coherent home node, may be arranged to issue a completion signal back to a requester element in response to a received access request from that requester element. Since the home node can act as a point of serialisation in respect of access requests received by it, it can in some instances issue a completion signal to the given requester element before the access request has actually been processed within the ultimate target slave element. In particular, a home node may be able to issue a completion signal to a requester element to indicate that sufficient steps have been taken by that home node to ensure that an outcome of an operation required by the access request will be observed by any further requester element that issues to that home node a further access request specifying the same memory address. Hence, the home node can be used to ensure global observability of the results of certain access requests even before those access requests have been processed by the ultimate slave element, to thereby provide performance benefits.

However, as will be discussed in more detail herein, this can cause issues when one or more bypass communication channels are provided, since the home node cannot ensure global observability if one or more requester elements might bypass the home node and access the slave element directly. This problem is addressed through the provision of control registers 320 within the coherent home node 6A, that can be used to provide a completion mode field for each of a plurality of different memory regions. When the completion mode field indicates a default mode, the home node may be arranged to enable issuance of the completion signal before the operation required by an access request has been performed by the slave element. However, when the completion mode field is instead set to indicate a delayed completion mode, then for at least certain types of request, the home node 300 will defer issuing the completion signal until the associated operation required by the request has been performed by the slave element.

As shown in FIG. 6B, a non-coherent home node 350 may include similar elements to a coherent home node 300, but without the snoop circuitry 305 and system cache 310. Hence, a non-coherent home node 350 may include buffers 355, retry control circuitry 365, exclusives monitor circuitry 370 and control registers 360, which may operate in the same way as the buffers 315, retry control circuitry 325, exclusives monitor circuitry 330 and control registers 320 of a coherent home node 300 as discussed earlier with reference to FIG. 6A.

The ability to change the completion mode of the home nodes can be very useful when supporting certain types of activities within a system such as that shown in FIG. 1, where, for at least certain slave elements, bypass communication channels are provided between certain requester elements and those slave elements. By way of example, it is possible for one or more requester elements to act as a producer of generated data that is then stored to one of the slave elements prior to that generated data then being accessed by a consumer element (which may be a different requester element to the one or more requester elements used to produce that data). Such an approach can allow data to be passed from one requester element to another via memory (i.e. memory provided by a slave element), but in situations where the completer element may be able to use a bypass communication channel to access the memory care needs to be taken to ensure that the data being generated by the one or more producer elements has actually found its way to memory before the consumer is granted access to the relevant address range in memory.

Figure 7:
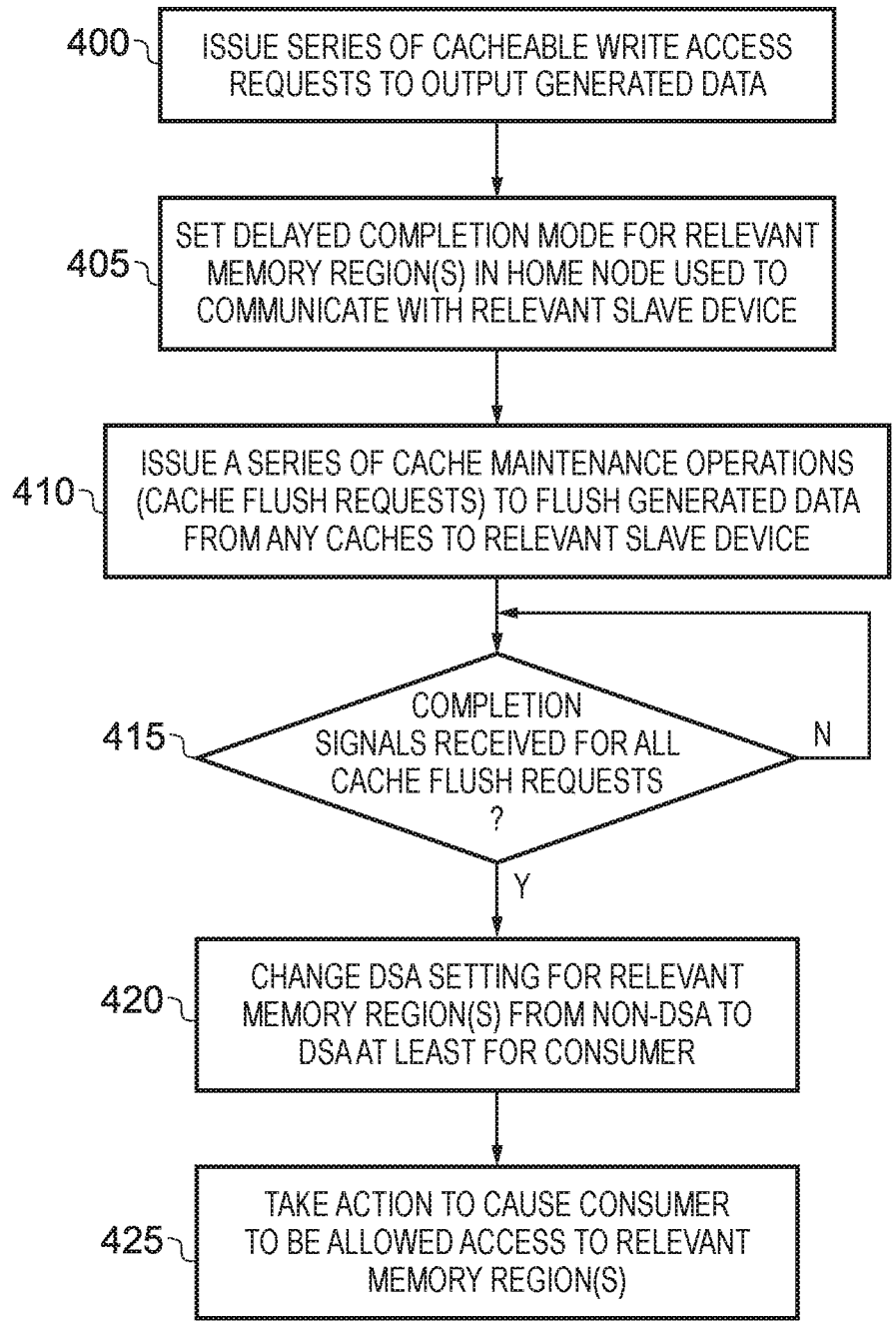
FIG. 7 is a flow diagram illustrating the operation of a producer element when generating cacheable data, in accordance with one example arrangement.

FIG. 7 is a flow diagram illustrating how a producer element may be operated when producing such data, in order to ensure that the consumer element is not given access to the relevant memory region in memory before the generated data has actually been written to that memory region.

At step 400, the producer element may issue a series of cacheable write access requests to output generated data to one or more memory regions within a slave element. Whilst a single producer element may be involved in this activity, in an alternative implementation there may be multiple producer elements involved in this activity, and each of the producer elements will be arranged to route those access requests through the interconnect to the home node associated with the slave element containing the memory region or memory regions in question.

At step 405, the producer element may be arranged to set the delayed completion mode for the relevant memory region or memory regions by updating the relevant control register or control registers 320 within the coherent home node handling those requests. Since the access requests relate to cacheable data, they will be routed via a coherent home node.

Having set the delayed completion mode, the producer element may then issue a series of access requests specifying cache maintenance operations (which may also be referred to herein as cache flush requests) to seek to cause the generated data to be flushed from any caches to the relevant slave device, as indicated by step 410 in FIG. 7. At step 415, the completion signals for all of the cache flush requests is then awaited. Since the delayed completion mode has been set, the home node will not issue such completion signals until the data identified by those cache flush requests has actually been flushed from the caches to the memory within the slave element. Accordingly, by the time all of the completion signals have been received for those cache flush requests, the producer element knows that the data has actually reached the slave elements.

At step 420, the producer element may then change the DSA setting for the relevant memory region or memory regions to identify that each such memory region is a DSA region. Whilst this may be done globally, for example by updating each SAM associated with the various requester elements, this is not essential, and at a minimum all that may be required is for the consumer that will utilise the generated data to be arranged to view the relevant memory region or memory regions as DSA regions. This step can be taken by notifying the relevant requester element in the system directly, or by updating the associated SAM. Hence by way of example, considering a situation where the consumer element may be the I/O master 20, a signal may be sent to the I/O master to identify that the relevant memory region or memory regions are now DSA regions. In due course, when that master device then issues access requests to access the data, the associated DSA enable bit can be set so as to cause the bypass communication channel to be used. Alternatively, if the approach of FIG. 4B is used, the associated SAM 45 can be updated in order to change the settings within the configuration registers 220 for the relevant memory region or memory regions, so that subsequent access requests issued by the master device to addresses within those regions will cause the bypass communication channel to be used.

As mentioned earlier, in other alternative implementations the DSA setting for any particular memory region may be fixed, at least in respect of the consumer, and hence for example the consumer may always view the required memory region(s) as being DSA regions, and in that event step 420 may not be needed.

Following step 420, or directly following step 415 if step 420 is not needed, then at step 425 the producer element can take action to cause the consumer to be allowed access to the relevant memory region or memory regions. The action taken at this point may vary dependent on implementation. For example, as will be discussed with reference to the later example of FIG. 9, a flag can be set for this purpose, the setting of the flag causing the consumer to determine that it now has access to the relevant memory region or memory regions. Alternatively, the consumer may have been placed into a sleep mode, and an interrupt may be issued by the producer element in order to wake up the consumer and allow it to access the relevant memory region or memory regions.

Whilst in the example of FIG. 7, the cacheable write access requests are issued before the delayed completion mode is set, in other implementations this may not be necessary, as the delayed completion mode may only apply to certain types of access request. Hence, in an alternative embodiment the delayed completion mode may be set at the start of FIG. 7, but may not apply to cacheable write access requests. Hence, after the delayed completion mode is set, the cacheable write access requests can be issued, and may result in early completion signals being issued for those access requests. However, for the subsequent cache maintenance operations, delayed completion signals will be issued.

Figure 8:
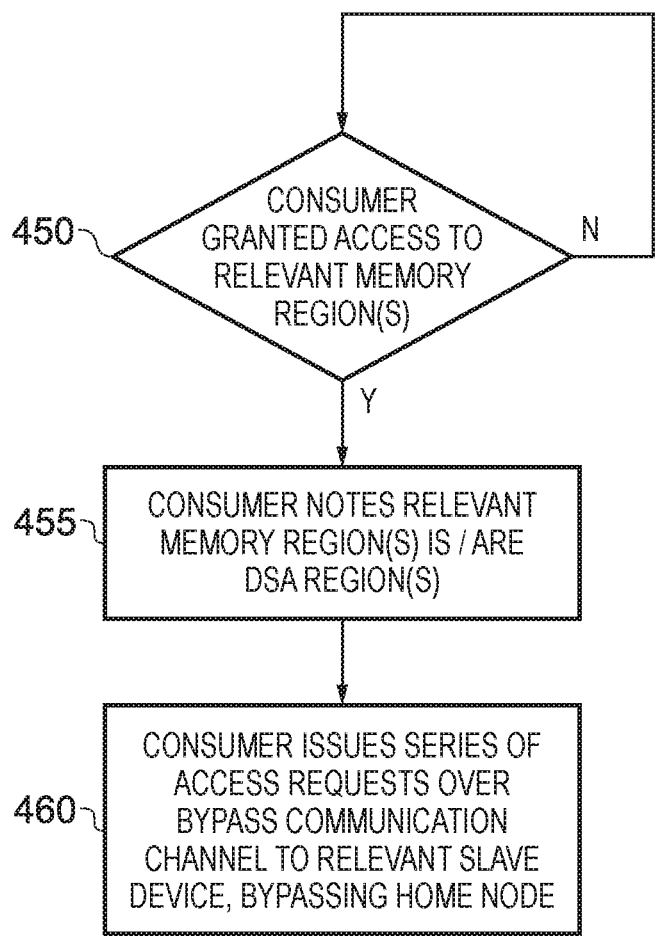
FIG. 8 is a flow diagram illustrating the operation of a consumer element in one example arrangement.

FIG. 8 is a flow diagram illustrating the operation of a consumer of the generated data in one example implementation. At step 450, the consumer determines whether it has been granted access to the relevant memory region or memory regions. Once it has, then at step 455 the consumer notes that the relevant memory region or memory regions are DSA regions, and then at step 460 issues a series of access requests that are routed over the bypass communication channel to the relevant slave device, bypassing the associated home node. This can significantly improve performance without any loss of functionality. In particular, in the scenario envisaged, once the producer element or elements has generated the required data, the consumer element is being given exclusive access to that data, and accordingly the point of serialisation functionality of the home node is not required. In addition, all of the data will have been flushed from the caches, and accordingly it is known that the consumer can safely access the most up to date data from the slave element, and thus the point of coherence functionality of the home node is not required. By using the direct communication channel, this can reduce the latency in handling the associated access requests, and avoid utilising bandwidth unnecessarily within the home node. As mentioned earlier, in some instances it may also be possible when using the bypass communication channels to access larger blocks of data in response to each request, which can further improve performance. In particular, there may be certain burst size constraints placed on access requests that are routed via home nodes, but those constraints may not apply when bypassing the home node.

Figure 9:
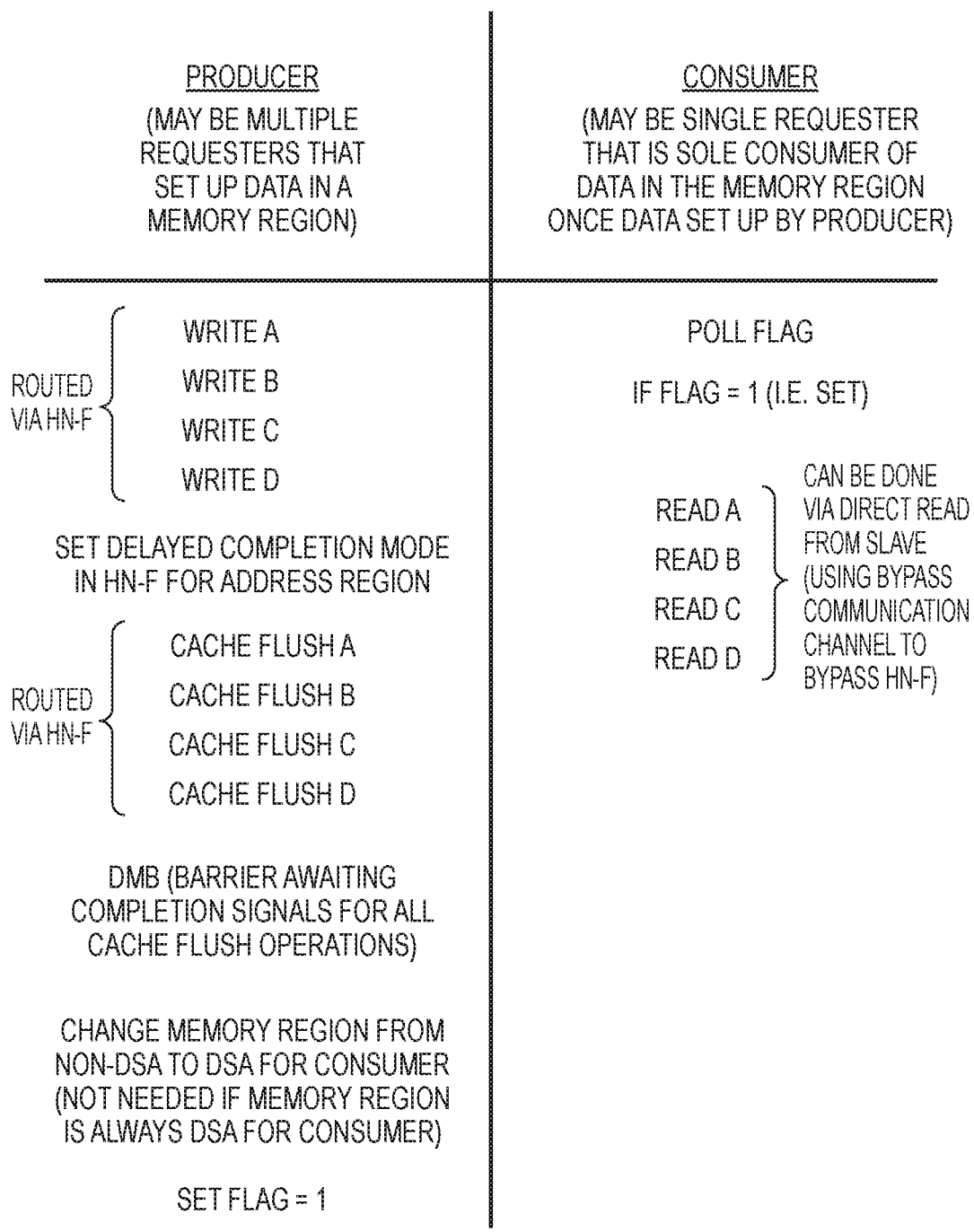
FIG. 9 schematically illustrates operations that may be performed in both a producer element and a consumer element in order to pass data via memory from the producer element to the consumer element, when the data is cacheable data, in accordance with one example arrangement.

FIG. 9 illustrates a particular example sequence of operations performed within both a producer and a consumer, when adopting the processing discussed with reference to FIGS. 7 and 8. The producer (which as discussed earlier may in fact be multiple requesters that are used collectively to set up data within a memory region) may be arranged to issue a sequence of write access requests, that will be routed via a coherent home node, since those write access requests relate to cacheable memory regions. Either before performing those write access requests, or, as shown in FIG. 9, at least before issuing any cache flush requests, the delayed completion mode in the relevant coherent home node is set for the address region in question. A series of cache flush requests are then issued via that home node, to cause the data to be flushed from the cache hierarchy into the memory address space of the slave element.

A memory barrier operation is then performed that causes the producer element to await completion signals for all of the preceding operations, including the cache flush operations, before proceeding further. Since the completion signals for the cache flush operations will be delayed until such time as the data has actually been flushed to the memory address space of the slave element, then by the time all those completion signals are received, it is known that the data is safely stored within the slave element. Thereafter, the status of the memory region, at least from the viewpoint of the consumer, can be changed from being a non-DSA region to a DSA region if required. As mentioned earlier, this may not be needed if the memory region is already viewed as a DSA region by the consumer. Thereafter, in the example shown in FIG. 9 a particular flag value is set equal to 1 (in an alternative implementation it will be appreciated that the flag value could be set to 0, depending on the value that is considered to correspond to the set state of the flag).

Meanwhile, the consumer will poll that flag, and whilst the flag is not set will not take any action. However, when it is detected that the flag is set, in this case having a value of 1, then the consumer can proceed to perform a series of read requests in order access the data that has been generated by the producer. Because the consumer will at this point detect that the direct slave access condition is present for the required memory region, then these read access requests can be issued via the bypass communication channel directly to the relevant slave element.

Whilst in FIG. 9 a flag mechanism is used to transfer control from the producer to the consumer, it will be appreciated that many other different techniques could instead be used to achieve the same aim. For example, an interrupt mechanism could be used to trigger the consumer to perform the read access request.

Figure 10:
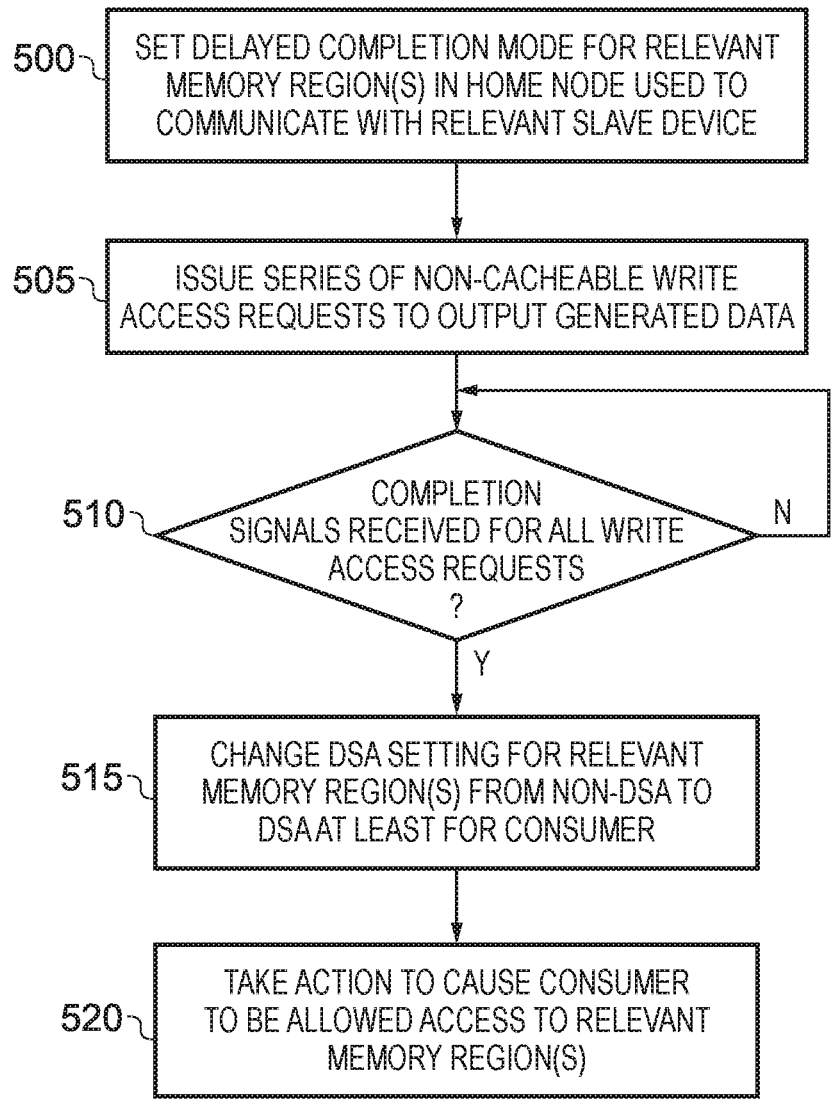
FIG. 10 is a flow diagram illustrating the operation of a producer element when generating non-cacheable data, in accordance with one example arrangement.

FIG. 10 is a flow diagram illustrating the operation of a producer element when generating non-cacheable data. Such data may be routed via a coherent home node or a non-coherent home node, is not subjected to any snoop functionality, and the data will not be cached in any caches of cache hierarchy.

At step 500, the delayed completion mode is set in the home node for the relevant memory region or memory regions that is used to communicate with the slave device containing the memory region or memory regions in which the generated data is to be written. A series of non-cacheable write access requests is then issued at step 505 in order to output the generated data. These write access requests are issued to the home node, and at step 510 the producer awaits completion signals for each of those write access requests. Since the delayed completion mode has been set, then for any non-cacheable write access requests the home node will not issue the completion signal until the relevant data has been passed through any intervening buffers and written into the slave element. Accordingly, by the time the completion signals are received, the producer element knows that the data has safely been stored within the slave element.

At step 515, the DSA setting for the relevant memory region or memory regions can be changed from non-DSA to DSA, at least for the consumer. As discussed earlier with reference to FIG. 7, this may involve informing the consumer directly as to the DSA status that is now present for the memory region, or may involve updating configuration registers within the associated SAM. Further, as also discussed with reference to FIG. 7, this step may not be needed if the relevant region or regions is statically configured as a DSA region from the point of view of the consumer.

At step 520, action is then taken to cause the consumer to be allowed access to the relevant memory region(s), using the same technique as discussed earlier with reference to step 425 of FIG. 7.

With regards to the actions performed by the consumer, the consumer may still perform the process discussed earlier with reference to FIG. 8, as this is independent of whether the generated data relates to a cacheable address region or a non-cacheable address region.

Figure 11:
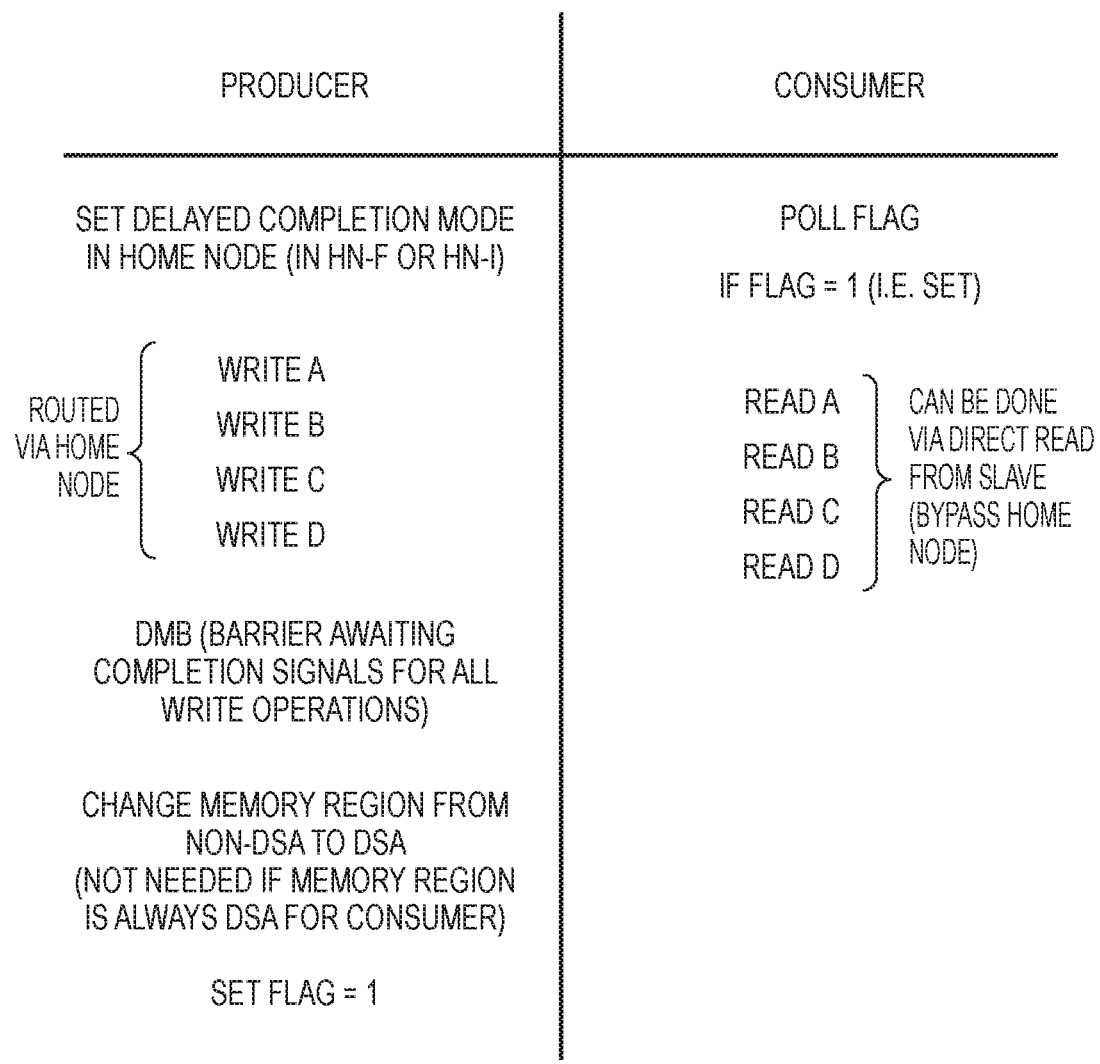
FIG. 11 schematically illustrates operations that may be performed in both a producer element and a consumer element in order to pass data via memory from the producer element to the consumer element, when the data is non-cacheable data, in accordance with one example arrangement.

FIG. 11 illustrates an example sequence of operations that may be performed by the producer and the consumer when transferring non-cacheable data between the producer and the consumer via the slave element. It should be noted that the same technique can also be used when performing write operations to device memory, in situations where the consumer will then access the data that has been written into the device memory. As shown in FIG. 11, the delayed completion mode is set in the home node that is associated with the relevant slave element, and as discussed earlier this may be a coherent home node or a non-coherent home node. A series of write access requests are then routed via that home node, whereafter a memory barrier operation is performed in order to await completion signals for all of those write operations. Thereafter, the relevant memory region or memory regions can be changed from non-DSA to DSA, at least from the viewpoint of the consumer. As discussed earlier, this step may not be needed if the relevant memory region or memory regions is always considered to be a DSA region by the consumer. Thereafter, a flag is set equal to 1. The consumer operates in the same way as discussed earlier with reference to FIG. 9, and hence when the consumer detects that the flag has been set it can proceed to perform a series of read access requests in order to read the data that has been written by the producer.

Figure 12:
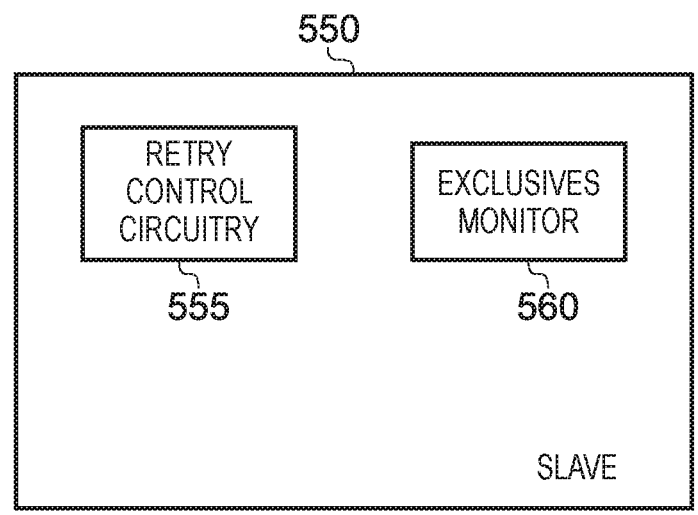
FIG. 12 schematically illustrates the provision of retry control circuitry and exclusives monitor circuitry within a slave element, in accordance with one example implementation.

When supporting the use of bypass communication channels in the manner discussed earlier, then there is certain functionality that may need to be migrated from home nodes to slave elements (or at least replicated in the slave elements). For example, as shown in FIG. 12, the slave element 550 may be provided with exclusives monitor circuitry 560 to control the handling of exclusive read and write requests. Such exclusive read and write access requests can be used to seek to acquire a lock value associated with a shared memory region, with only one requester element being allowed to obtain that lock at any point in time. The exclusives monitor circuitry can control this behaviour, and would typically be provided within the home node since all issued access requests would be expected to be routed via the home node. However, to support situations where the bypass communication channel is used, the exclusives monitor circuitry 560 may additionally be provided within the slave element 550 in order to handle such exclusive access requests, and the slave element may then receive both exclusive access requests propagated from a requester element via a home node to the slave element, and exclusive access requests received directly at the slave element over a bypass communication channel from a requester element. In such scenarios, any exclusives monitor circuitry functionality provided within the home node may be turned off, and instead such exclusive access requests received by the home node may merely be propagated on to the slave element, where the exclusives monitor circuitry 560 will then handle the various exclusive access requests.

As another example, the slave element 550 may include retry control circuitry to manage the issuance of retry signals for any access requests that it rejects. Typically it would only need to track access requests received from home nodes, but in accordance with the techniques described herein the retry control circuitry 555 is extended so as to also be able to track access requests received over bypass communication channels directly from requester elements, so as to enable retry requests to be issued over the appropriate communication channel in due course.

By adopting the direct slave access mechanism described herein, this can allow reduced latency for certain memory access operations, and can also avoid wasting bandwidth at the home node and consuming unnecessary power within the home node. It can also allow better bandwidth management and quality of service at the slave element for direct slave access versus non-direct slave access traffic. In addition, the technique potentially allows bigger, more efficient, burst traffic than may be supported for access requests that are routed via a home node.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a plurality of requester elements to issue access requests;
a slave element to be accessed in response to the access requests;
an interconnect to couple the plurality of requester elements with the slave element, the interconnect providing an intermediate element acting as a point of serialisation to order the access requests issued by the plurality of requester elements via the intermediate element; and
the interconnect further providing communication channels to support communication between each of the requester elements and the intermediate element, and between the intermediate element and the slave element;
wherein:
at least one requester element in the plurality of requester elements is a channel selectable requester element, and the interconnect further provides, for each channel selectable requester element, a bypass communication channel to support a direct communication between that channel selectable requester element and the slave element that bypasses the intermediate element; and
each channel selectable requester element is arranged, in the presence of a direct slave access condition, to issue an access request over the bypass communication channel to the slave element without that access request passing via the intermediate element.

2. An apparatus as claimed in claim 1, wherein, for each access request, presence of the direct slave access condition is determined in dependence on a memory address specified by that access request.

3. An apparatus as claimed in claim 1, further comprising:
address mapping circuitry associated with each requester element to convert a memory address specified by an access request issued by that requester element into a target identifier indicating a completer element to which the access request is to be routed via the communication channels;
wherein the address mapping circuitry associated with each channel selectable requester element is arranged, in the presence of the direct slave access condition, to generate the target identifier to indicate the slave element as the completer element, whereby the access request is routed over the bypass communication channel to the slave element.

4. An apparatus as claimed in claim 3, wherein the address mapping circuitry is arranged to receive a control signal which indicates whether the direct slave access condition is present.

5. An apparatus as claimed in claim 4, wherein at least one channel selectable requester element is arranged to issue the control signal to its associated address mapping circuitry.

6. An apparatus as claimed in claim 4, wherein:
at least one channel selectable requester element is arranged to receive an initial request from an associated master device coupled to that channel selectable requester element, and to generate the access request from the initial request; and
the control signal is provided in the initial request.

7. An apparatus as claimed in claim 3, wherein the address mapping circuitry has configuration storage arranged to identify, for each of a plurality of memory regions, whether the direct slave access condition is present.

8. An apparatus as claimed in claim 1, wherein:
each access request specifies a memory address;
the intermediate element is arranged, when processing an access request specifying a given memory address that has been received from a given requester element within the plurality of requester elements, to issue a completion signal to the given requester element to indicate that sufficient steps have been taken by the intermediate element to ensure that an outcome of an operation required by that access request will be observed by a further requester element within the plurality of requester elements that issues to the intermediate element a further access request specifying that given memory address; and
the intermediate element has control storage associated therewith providing a completion mode field;
wherein:
when the completion mode field indicates a default mode, the intermediate element is arranged to enable issuance of the completion signal before the operation required by the access request has been performed by the slave element; and
when the completion mode field indicates a delayed completion mode, the intermediate element is arranged, for at least a subset of access request types, to defer issuing the completion signal until the operation required by the access request has been performed by the slave element.

9. An apparatus as claimed in claim 8, wherein the completion mode field is provided for each of a plurality of memory regions.

10. An apparatus as claimed in claim 9, wherein:
the given requester element is arranged to operate as a producer element to output generated data for storage in the slave device at memory addresses within a given memory region;
a given channel selectable requester element, different to the given requester element, is arranged to operate as a consumer element to process the generated data;
the producer element is arranged to communicate with the intermediate element and, at a selected point prior to the consumer element being allowed access to the given memory region, is arranged to cause the completion mode field for the given memory region to be set to indicate the delayed completion mode;
the producer element is arranged to issue one or more requests to the intermediate element after the completion mode field has been set to indicate the delayed completion mode; and
the producer element is arranged to await receipt of the completion signal for each of the one or more requests before taking an action that causes the consumer element to be allowed access to the given memory region.

11. An apparatus as claimed in claim 10, wherein:
when the consumer element is allowed access to the given memory region, the consumer element is arranged to issue access requests over the bypass communication channel to the slave device in order to access the generated data.

12. An apparatus as claimed in claim 11, wherein the producer element is arranged to trigger a direct slave access condition setting operation in respect of the given memory region prior to the consumer element being allowed access to the given memory region, such that when the consumer element subsequently issues the access requests to access the generated data the consumer element determines that the direct slave access condition exists and hence issues the access requests over the bypass communication channel.

13. An apparatus as claimed in claim 11, wherein:
at least one of the requester elements has associated cache storage;
the intermediate element provides snoop circuitry to implement a cache coherency protocol when an access request received by the intermediate element identifies a cacheable memory address, such that the intermediate element acts as a point of coherence for the access requests issued by the plurality of requester elements;
at least a subset of the generated data is associated with cacheable memory addresses; and
the one or more requests issued by the producer element to the intermediate element after the completion mode field has been set to indicate the delayed completion mode comprise cache flush requests that cause a cached copy of the generated data stored in any cache storage to be flushed to the slave element.

14. An apparatus as claimed in claim 11, wherein:
the generated data is non-cacheable data;
the one or more requests issued by the producer element to the intermediate element after the completion mode field has been set to indicate the delayed completion mode comprises write access requests specifying the generated data;
the apparatus provides write buffer circuitry to enable temporary buffering of data to be written to the slave device, before that data is written to the slave device; and
the setting of the completion mode field for the given memory region to indicate the delayed completion mode before the write access requests specifying the generated data are issued ensures that the producer element only receives completion signals for those write access requests once the generated data has been stored in the slave element.

15. An apparatus as claimed in claim 14, wherein the given memory region comprises device memory.

16. An apparatus as claimed in claim 1, wherein:
the slave element comprises exclusives monitor circuitry to handle exclusive access requests issued by the plurality of requester elements in order to seek to acquire exclusive access to a memory region, wherein the exclusives monitor circuitry is arranged to receive both exclusive access requests propagated from a requester element via the intermediate element over the communication channel between the intermediate element and the slave element, and exclusive access requests received over the bypass communication channel directly from a requester element.

17. An apparatus as claimed in claim 1, wherein:
the slave element comprises retry control circuitry to track, for both the intermediate element and each requester element having the bypass communication channel, access requests for which retry signals have been issued by the slave device.

18. An apparatus as claimed in claim 1, wherein the bypass communication channel further supports the provision of a response to an access request from the slave device to the associated requester element, bypassing the intermediate element.

19. A method of routing access requests in an interconnect, comprising:
employing the interconnect to couple a plurality of requester elements used to issue access requests with a slave element to be accessed in response to the access requests;
providing an intermediate element in the interconnect to act as a point of serialisation to order the access requests issued by the plurality of requester elements via the intermediate element;
providing communication channels to support communication between each of the requester elements and the intermediate element, and between the intermediate element and the slave element;
arranging at least one requester element in the plurality of requester elements to be a channel selectable requester element;
providing, for each channel selectable requester element, a bypass communication channel to support a direct communication between that channel selectable requester element and the slave element that bypasses the intermediate element; and
causing each channel selectable requester element, in the presence of a direct slave access condition, to issue an access request over the bypass communication channel to the slave element without that access request passing via the intermediate element.

20. An apparatus comprising:
a plurality of requester element means for issuing access requests;
a slave element means for being accessed in response to the access requests;
interconnect means for coupling the plurality of requester element means with the slave element means, the interconnect means providing an intermediate element means for acting as a point of serialisation to order the access requests issued by the plurality of requester element means via the intermediate element means; and
the interconnect means further providing communication channel means for supporting communication between each of the requester element means and the intermediate element means, and between the intermediate element means and the slave element means;
wherein:
at least one requester element means in the plurality of requester element means is a channel selectable requester element means, and the interconnect means further provides, for each channel selectable requester element means, a bypass communication channel means for supporting a direct communication between that channel selectable requester element means and the slave element means that bypasses the intermediate element means; and
each channel selectable requester element means is arranged, in the presence of a direct slave access condition, to issue an access request over the bypass communication channel means to the slave element means without that access request passing via the intermediate element means.

* * * * *